(12) United States Patent
Ait Bouziad et al.

(10) Patent No.: US 10,820,742 B2
(45) Date of Patent: Nov. 3, 2020

(54) BEVERAGE PREPARATION DEVICE FOR HOT AND COLD BEVERAGES

(71) Applicant: NESTEC S.A., Vevey (CH)

(72) Inventors: Youcef Ait Bouziad, Echandens (CH); Fabien Ludovic Agon, Blonay (CH); Alfred Yoakim, St-Legier-la-Chiesaz (CH)

(73) Assignee: Societe des Produits Nestle S.A., Vevey (CH)

( * ) Notice: Subject to any disclaimer, the term of this patent is extended or adjusted under 35 U.S.C. 154(b) by 473 days.

(21) Appl. No.: 15/310,624

(22) PCT Filed: May 7, 2015

(86) PCT No.: PCT/EP2015/060024
§ 371 (c)(1),
(2) Date: Nov. 11, 2016

(87) PCT Pub. No.: WO2015/173100
PCT Pub. Date: Nov. 19, 2015

(65) Prior Publication Data
US 2017/0079467 A1    Mar. 23, 2017

(30) Foreign Application Priority Data
May 13, 2014 (EP) .................................. 14168001

(51) Int. Cl.
*A47J 31/44* (2006.01)
*A47J 31/46* (2006.01)
*A47J 31/40* (2006.01)

(52) U.S. Cl.
CPC ......... *A47J 31/4403* (2013.01); *A47J 31/407* (2013.01); *A47J 31/4496* (2013.01); *A47J 31/46* (2013.01)

(58) Field of Classification Search
None
See application file for complete search history.

(56) References Cited

U.S. PATENT DOCUMENTS 3,683,790 A * 8/1972 Black .................... A47J 31/002
99/289 R
4,919,041 A * 4/1990 Miller ................... A47J 31/007
99/279

(Continued)

FOREIGN PATENT DOCUMENTS

CN    1615780 A    5/2005
CN    1907188 A    2/2007

(Continued)

*Primary Examiner* — Ibrahime A Abraham
*Assistant Examiner* — John J Norton
(74) *Attorney, Agent, or Firm* — K&L Gates LLP

(57) ABSTRACT

The present invention relates to a beverage preparation device for preparing hot and cold beverages, the device (30) comprising a hot extraction module (10) comprising a brewing unit (1) for injection of hot liquid into a beverage ingredients containing capsule, a hot beverage outlet (2) connected to the brewing unit (1) for dispensing of a hot extracted beverage, and a cooling module (20) comprising a cooling reservoir (5) for receiving the hot extracted beverage, wherein the hot beverage outlet (2) and the cooling module (20) are arranged moveably relative to each other such that the hot extracted beverage may be selectively dispensed from the hot beverage outlet (2) into the cooling reservoir (5) of the cooling module (20) in at least one relative position of the hot beverage outlet (2) and the cooling module (5).

24 Claims, 4 Drawing Sheets

(56) References Cited

U.S. PATENT DOCUMENTS

| | | | |
|---|---|---|---|
| 5,724,883 A | 3/1998 | Usherovich | |
| 2009/0173235 A1* | 7/2009 | Kollep | A47J 31/4482 99/279 |
| 2011/0030564 A1* | 2/2011 | Cocco | A47J 31/3671 99/323.3 |
| 2013/0061763 A1* | 3/2013 | Piai | A47J 31/44 99/295 |
| 2013/0087050 A1* | 4/2013 | Studor | A47J 31/52 99/285 |
| 2013/0206013 A1* | 8/2013 | De'Longhi | A47J 31/4485 99/293 |

FOREIGN PATENT DOCUMENTS

| | | |
|---|---|---|
| CN | 1907191 A | 2/2007 |
| CN | 101621949 A | 1/2010 |
| CN | 102014710 A | 4/2011 |
| CN | 102014711 A | 4/2011 |
| CN | 102905587 A | 1/2013 |
| CN | 103298383 A | 9/2013 |
| EP | 2080459 | 7/2009 |
| GB | 2447024 | 9/2008 |
| WO | 2009130661 | 10/2009 |
| WO | 2013098173 | 7/2013 |

* cited by examiner

BEVERAGE PREPARATION DEVICE FOR HOT AND COLD BEVERAGES

CROSS REFERENCE TO RELATED APPLICATIONS

The present application is a National Stage of International Application No. PCT/EP2015/060024, filed on May 7, 2015, which claims priority to European Patent Application No. 14168001.7, filed May 13, 2014, the entire contents of which are being incorporated herein by reference.

FIELD OF THE INVENTION

The present invention relates to a beverage preparation device for preparing a beverage from a beverage ingredients containing capsule. In particular, the present invention relates to a device for selective preparation of different beverages such as in particular hot and cold beverages.

BACKGROUND OF THE INVENTION

Devices for preparation of a beverage such as coffee or tea from ingredients containing capsules are well-known in the prior art. These devices are generally stationary devices equipped with a liquid tank, a pump and heating means in order to provide pressurized, heated liquid through a capsule inserted into the device. The liquid is injected into the capsule and will interact with the ingredients provided in the capsule. The resulting beverage is then drained from the capsule and may be collected in a dedicated receiving vessel such as a coffee cup.

A drawback of the known systems in particular in the field of coffee making appliances is the fact that these devices are usually designed for dispensing a serving of hot coffee beverage only. Thereby, the device comprises a brewing unit adapted for processing capsules linked to a hot water circuit of the device. The device is thus limited to being used for preparation of hot coffee beverages, which is generally due to a pre-set optimal brewing or extraction temperature for the coffee ingredients within the capsule to be used with the device.

Dependent on the season and on taste preferences of a consumer, the consumer may however want to prepare a beverage of different temperature, in particular of a lower temperature than a pre-set standard temperature of the device. This desire is however in conflict with the need for an optimal extraction or brewing temperature of the beverage ingredients, which in case of coffee lies between about 90° C. to 96° C.

Therefore, if a consumer desires to prepare a beverage of lower temperature than a pre-set extraction or brewing temperature of the device, such as e.g. an iced coffee beverage or chilled tea beverage, he is required to take the freshly prepared hot beverage and store it in a fridge or freezer in order to cool the beverage to a desired temperature. This is however rather inconvenient and time-consuming. An alternative to this approach is the provision of ice-cubes into the freshly prepared beverage which leads however to an undesired dilution of the beverage.

It is known from the state of the art, for example as per document U.S. Pat. No. 5,724,883 A, a beverage brewing device comprising a conventional brewing assembly and a cooling assembly for brewing a hot beverage and either delivering a hot beverage or a cooled beverage after having diverted it to the cooling assembly. Also known is WO 2009/130661 A2, for example, disclosing a machine for preparing beverages, also comprising an additional vessel where a cold ingredient can be added.

The present invention thus seeks to enable a convenient preparation of a beverage at a particularly preferred temperature, while at the same time maintaining the optimal extraction respectively brewing temperature for the particular beverage type. The present invention also seeks to address further problems as will become apparent in the following description.

OBJECT AND SUMMARY OF THE INVENTION

The invention relates to a beverage preparation device for preparing hot and cold beverages comprising a hot extraction module, designed for the preparation of a hot beverage, and a cooling module, designed for cooling the hot beverage previously prepared.

The hot extraction module comprises a brewing unit for injection of hot liquid into a beverage ingredients containing capsule and a hot beverage outlet connected to the brewing unit for dispensing of a hot extracted beverage.

The cooling module comprises a cooling reservoir for receiving the hot extracted beverage, and cooling means for cooling the hot extracted beverage provided into the reservoir.

According to the invention, the hot beverage outlet and the cooling module are arranged moveably relative to each other such that the hot extracted beverage may be selectively dispensed from the hot beverage outlet into the cooling reservoir of the cooling module in at least one relative position of the hot beverage outlet and the cooling module.

The device according to the invention enables the selective preparation of a hot or cold beverage dependent on the relative position of the hot beverage outlet and the cooling module with respect to each other. Moreover, the hot extraction module is adapted for applying the optimal extraction respectively brewing temperature depending on the relative position of the hot beverage outlet and the cooling module with respect to each other. Accordingly, a convenient preparation of a beverage at a desired hot or cold temperature is enabled. Consequently, optimal extraction respectively brewing parameters are provided for the beverage type, while the consumer may choose between the provision of the beverage in a hot or cold state respectively temperature.

It should be understood that by cold beverage, both cold and chilled beverages are comprised within the scope of the present invention: typically, a cold beverage is provided at a temperature ranging from 10° C. to 6° C., preferably about 8° C., and a chilled beverage is typically provided at a temperature ranging from 3° C. to 6° C., preferably about 4° C.

The hot extraction module of the device is designed for preparation of a hot beverage, in particular for preparation of a coffee or tea beverage by means of injection of hot liquid into a beverage ingredients containing capsule.

The hot beverage extraction module of the device preferably comprises a liquid reservoir for providing a liquid such as water to the brewing unit, a pump and a heating means (such as a thermoblock) which are in fluid connection with the liquid reservoir. The pump and the heating means are connected to the brewing unit of the device in order to enable the provision of a heated pressurized liquid to the brewing unit.

The brewing unit of the device is adapted for receiving and enclosing a capsule containing a predefined portion of beverage ingredients such as coffee powder. The capsule for being used in conjunction with the device preferably comprises a truncated cone-shaped body portion having a flange-like rim extending from the body portion, whereby a sealing membrane is connected to the flange-like rim. The capsule is preferably made from aluminum, but may as well be made from different materials such as plastic or biodegradable polymer material.

In a preferred embodiment, the hot beverage outlet is preferably comprised by the brewing unit of the device respectively integrally formed therewith. Thus, the brewing unit and the cooling module are preferably arranged movably relative to each other. Accordingly, the hot extracted beverage may be selectively dispensed from the brewing unit respectively from the hot beverage outlet formed integrally therewith into the cooling reservoir of the cooling module in at least one relative position of the hot beverage outlet and the cooling module.

In a preferred embodiment, the brewing unit and the hot beverage outlet are arranged in a rotatable movable manner at the hot extraction module of the device. Thereby, the brewing unit may be mounted on a rotatable platform member which enables the rotation of the brewing unit and the hot beverage outlet about a rotational axis. The brewing unit may be arranged movable manually or automatically, e.g. in response to a button or switch that is activated by the user of the device, or may be for example arranged movable automatically, after a dedicated sensor has read identification means in the beverage ingredients containing capsule providing the information of the type of beverage.

Also according to the invention, the brewing unit and the hot beverage outlet can be arranged movably relative to each other by a translatory motion, by a combination of a rotatory and translatory motion, or by any other relative movement.

The brewing unit and the cooling module are preferably adapted for assuming at least two positions relative to each other, a first direct hot beverage dispensing position and a second cold beverage preparation position respectively an indirect beverage preparation position. In the first hot beverage dispensing position, the device is configured for delivering the extracted beverage directly from the hot beverage outlet into a receptacle such as a coffee cup. In the second cold beverage preparation position, the device is configured for preparing a cold or chilled beverage in the cooling reservoir of the device.

In the first direct hot beverage dispensing position, the hot beverage outlet is preferably arranged outside of the contours of a receiving opening of the cooling reservoir when seen from above. A receiving receptacle may thus be placed below the hot beverage outlet in order to collect the beverage drained from the outlet.

In the second position the hot beverage outlet is preferably arranged vertically above a receiving opening of the cooling reservoir, respectively inside of the contours of the receiving opening of the cooling reservoir when seen from above. In said second position, the beverage prepared by the brewing unit of the hot extraction module is dispensed in its initial hot state from the hot beverage outlet directly into the cooling reservoir. Therein, the beverage is then brought to a lower temperature upon cooling. The cooling reservoir of the device thus comprises dedicated cooling means arranged preferably at the perimeter of the reservoir in order to enable the cooling of liquid provided into the reservoir.

The cooling reservoir may be selectively connectable to a support means of the cooling unit. Accordingly, after the cooling process of the beverage within the reservoir is finished, the user may disconnect the cooling reservoir from the support means and pour the resulting cold beverage from the cooling reservoir into a dedicated receiving receptacle.

The cooling module may as well comprise a dedicated outlet for dispensing the resulting cooled beverage into a dedicated receiving receptacle.

The hot extraction module and the cooling module are preferably spaced apart from each other. In a particular preferred arrangement, the hot extraction module and the cooling module are arranged adjacent to each other. The hot extraction module preferably extends to a higher vertical height than the receiving opening of the cooling module. Thereby, the brewing unit and the hot beverage outlet are preferably arranged at a higher vertical height than the receiving opening of the cooling module. The hot beverage outlet of the extraction module may thus be brought into a position above the receiving opening of the cooling reservoir in order to dispense the hot beverage directly into the cooling reservoir.

The cooling module may be designed for selectively providing an additional liquid component into the cooling reservoir. Thereby, the cooling module may comprise liquid injection means connected to a liquid supply for the additional liquid component. Accordingly, a mixed beverage further comprising the hot beverage provided to the cooling module by means of the hot extraction module may be prepared. The additional liquid may for example be milk or a flavouring additive such as e.g. syrup.

The cooling module may further comprise foaming means designed for the foaming of a liquid contained in the cooling reservoir of the module.

In a preferred embodiment, the hot extraction module and the cooling module are designed for being controlled independently according to independent beverage modes. For this reason, the device preferably comprises a control unit designed for providing different operation modes of the device. The different operation modes of the device are preferably dependent on the relative position of the hot extraction module respectively the brewing unit thereof and the cooling unit.

The control unit is preferably designed to automatically set the preparation parameters of the hot extraction module and the cooling module dependent on the position of the device. The preparation parameters include but are not limited to the temperature of the water being injected into the capsule, the flow rate and volume of water provided through the capsule and the brewing unit, the cooling temperature of the cooling module, the provision of a foaming operation within the cooling unit, the addition of extra liquid, etc.

The control unit is preferably designed for adapting the temperature of the liquid injected into the ingredients containing capsule in the brewing unit of the device. Accordingly, the brewing respectively extraction temperature of the liquid into the capsule enclosed by the brewing unit of the device may be adapted by the control unit.

In a particular preferred embodiment, the control unit controls the water temperature used for injection to the capsule in the hot extraction module to be lower in the cold beverage preparation position of the device than in the direct hot beverage preparation position.

In a preferred embodiment, the device comprises a user interface such as e.g. a graphical user interface adapted for enabling a selection of beverage preparation parameters dependent on the preparation position of the device.

The user interface is preferably designed to enable the selection and operation of the device to produce a beverage at a cooled, chilled or optionally ambient temperature in case the device is in the cold beverage preparation position. The user interface preferably enables the selection and operation of the device to produce a hot beverage in the direct hot beverage preparation position of the device.

The user interface preferably further enables the selection and operation of the device in a mode to provide a mixed cooled beverage in the cold beverage preparation position. Thereby, the user interface preferably enables the selection of addition of a second liquid component such as e.g. milk into the reservoir and/or foaming of the beverage comprised in the liquid reservoir of the cooling module. Accordingly a mixed coffee beverage such as e.g. iced whitened coffee beverage may be prepared.

The control unit and/or the user interface of the device are preferably connected to dedicated positioning sensors providing information about the beverage preparation position of the device.

The control unit and the user interface are preferably designed for providing a selected choice of the modes on the user interface such as e.g. short black coffee, long black coffee, iced cappuccino, long iced black coffee. Thereby, only selections compatible with the beverage preparation position of the device are preferably offered to the consumer.

The present invention thus enables the provision of conveniently preparing a wide range of hot and cold beverages such as small, medium or large sized hot or cold beverages, with or without milk or addition liquids such as e.g. syrups, as well as foamed or not foamed beverages.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1A:
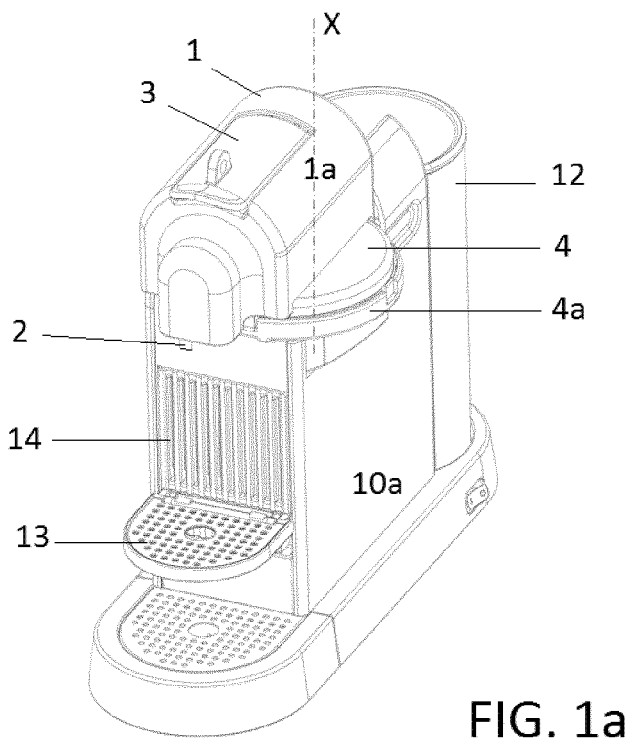
FIG. 1a is a perspective side view of a preferred embodiment of the hot beverage extraction module of the device according to the invention.
Figure 1B:
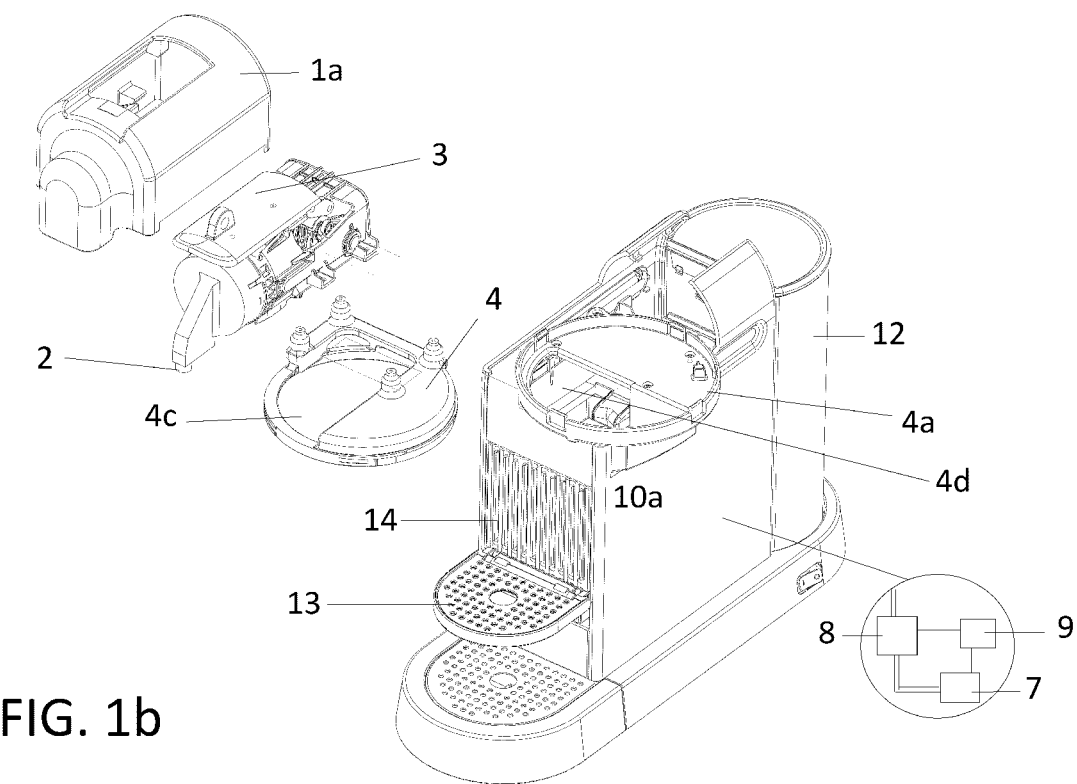
FIG. 1b is an exploded assembly drawing of the hot beverage extraction module of the device according to the invention in a direct hot beverage preparation position.
Figure 1C:
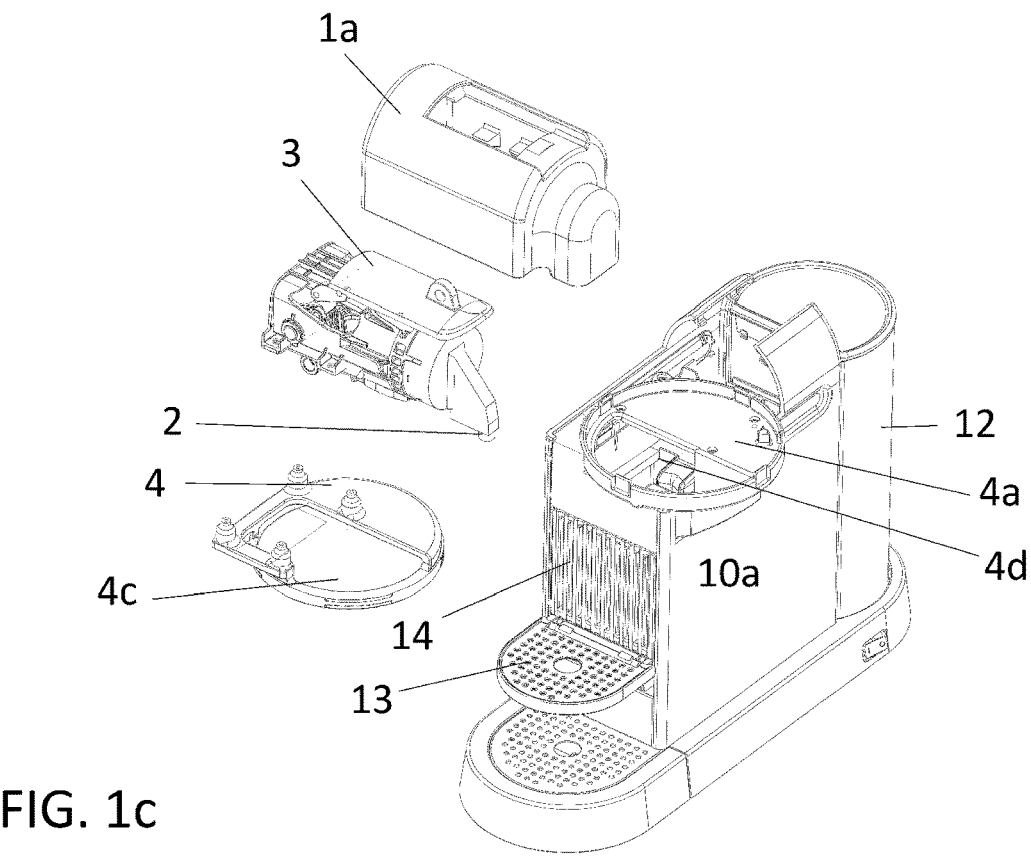
FIG. 1c is an exploded assembly drawing of the hot beverage extraction module of the device according to the invention in a cold beverage preparation position respectively in an indirect beverage preparation position.

FIGS. 1a and 1b relate to a preferred embodiment of the hot extraction module 10 of the device 30 according to the invention.

The hot extraction module 10 comprises a housing 10a and a liquid reservoir or tank 12 selectively connectable to the housing 10a. The module 10 further comprises a pump 7 and heating means 8 such as a thermoblock, which are connected to the liquid reservoir 12 and a brewing unit 1 of the module 10. The hot extraction module 10 is thus designed for provision of a heated pressurized liquid into the brewing unit 1 of the module 10.

The module 10 further comprises a control unit 9 which is connected at least to the pump 7 and the heating means 8. The control unit is preferably further connected to a user interface 11 of the device.

The brewing unit 1 of the module 10 comprises a hot beverage outlet 2 and a lid member 3 for selectively opening a slot sized for introduction of a capsule to the interior of the brewing unit 1. The slot is preferably connected to a brewing chamber of the brewing unit 1 in which the capsule is safely retained during injection of liquid thereto. The brewing unit 1 further comprises a housing 1a.

The brewing unit 1 is preferably arranged at a top portion of the hot beverage module 10, thereby forming an extraction head of the hot beverage extraction module 10.

The brewing unit 1 is connected to the module 10 respectively a housing 10a thereof by movable means, preferably by a rotationally movable platform member 4. The platform member 4 is arranged rotationally movable with respect to a supporting plate 4a of the module 10 respectively the housing 10a thereof. The platform member 4 enables the selective rotation of the brewing unit 1 and the hot beverage outlet 2 about a rotational axis X of the platform member 4. The brewing unit 1 is preferably adapted to rotate about at least an angle of 90° between a first hot beverage preparation position (see FIG. 1a) and a cold beverage preparation position (see FIG. 3). The angle of rotation of the brewing unit 1 with respect to the housing 10a may however vary, preferably between 90° and 180°.

The platform member 4 and the supporting plate 4a preferably comprise vertical openings 4c and 4d, arranged such as to allow the passing of a capsule ejected vertically downwards from the beverage brewing unit 1. In particular, upon activation of lid member 3 after the beverage preparation, the used capsule still contained within the brewing unit 1 may be ejected downwards from the brewing unit 1 through openings 4c and 4d into a dedicated tray 14 for collecting used capsules. The openings 4c, 4d are preferably shaped and aligned in vertical arrangement such that independent of the relative rotational position of the platform member 4 and the supporting plate 4a, a vertical transport of a capsule through openings 4c, 4d is enabled.

The module 10 further comprises a support 13 onto which a receiving receptacle such as a coffee cup or a tea cup may be placed. In the hot beverage preparation position of the device as depicted in FIG. 1a, the hot beverage outlet 2 is arranged vertically above the support 13 for directly dispensing the hot beverage provided by the brewing unit 1 to a receiving receptacle.

Figure 2:
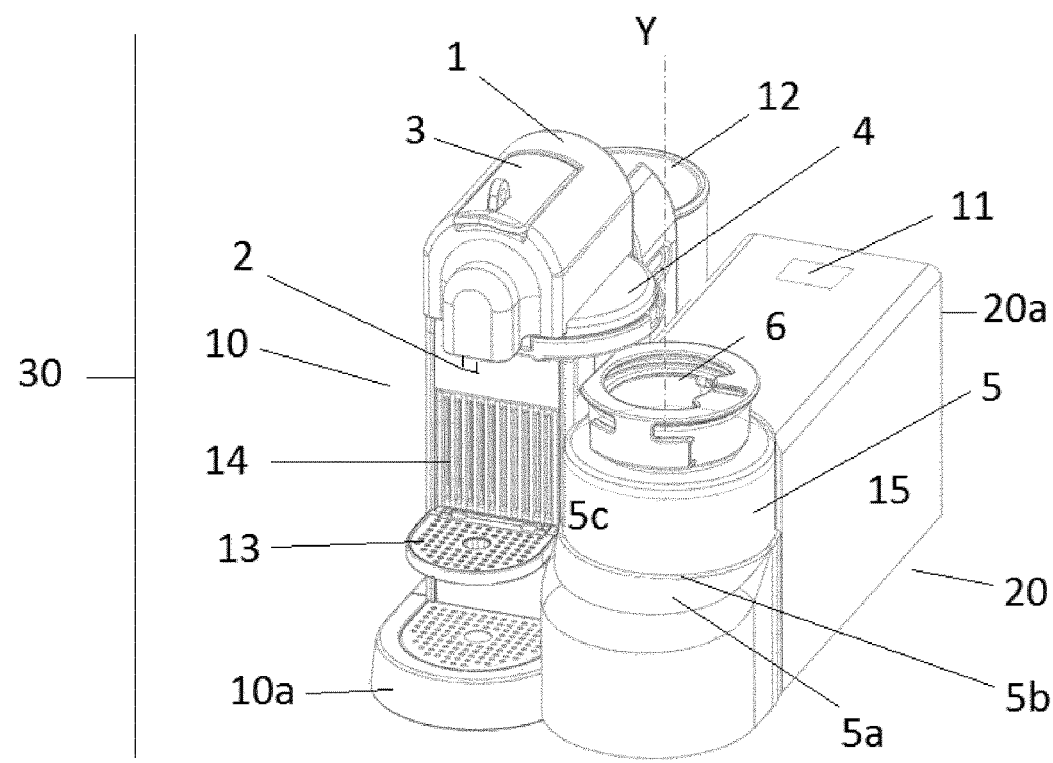
FIG. 2 relates to a preferred embodiment of the device according to the invention in a direct hot beverage preparation position.
Figure 3:
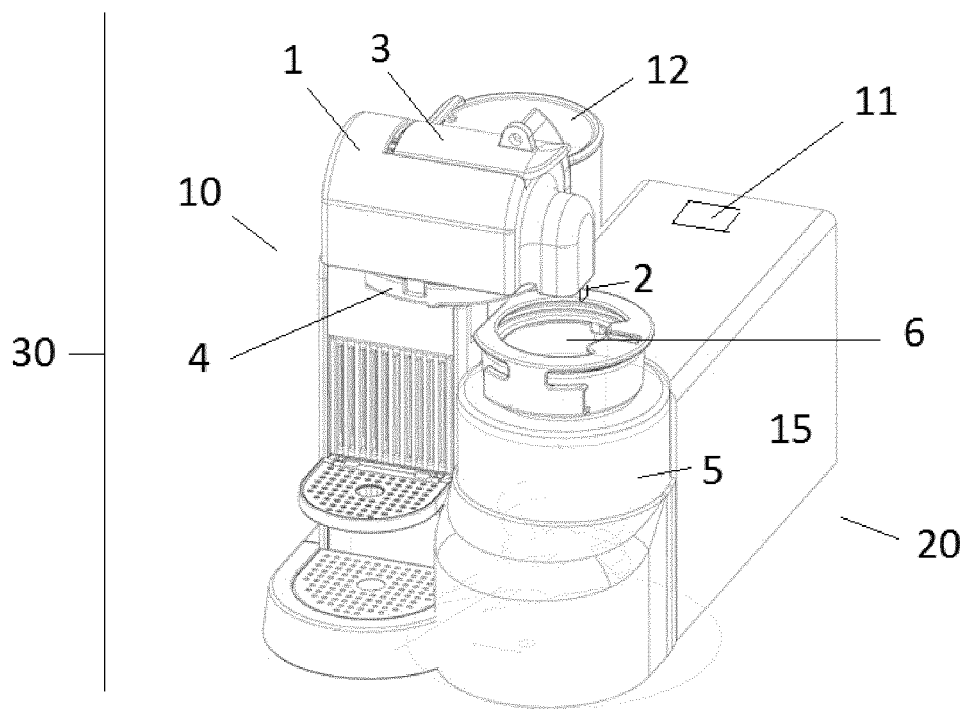
FIG. 3 relates to the embodiment of the device according to FIG. 2 in a cold beverage preparation position respectively in an indirect beverage preparation position.

FIGS. 2 and 3 relate to a preferred embodiment of the device 30 according to the invention. The device 30 comprises the hot extraction module 10 and a cooling module 20. The hot extraction module 10 and the cooling module 20 are preferably placed adjacent to each other at the device 30. Thereby, the hot extraction module 10 and/or the cooling module 20 may comprise dedicated connection means for establishing a fixed positioning between the respective modules 10, 20.

The cooling module 20 preferably comprises a cooling reservoir 5 that is preferably selectively connectable to the device 30 respectively the cooling module 20. Thereby, the cooling module 20 preferably comprises dedicated support means 5a which are adapted to receive the cooling reservoir 5. Thereby, a bottom portion 5b of the reservoir 5 is preferably designed for being received by the support means 5a.

The cooling reservoir 5 is preferably of essentially cylindrical form and preferably comprises a receiving opening 6 arranged at a top portion thereof. A rotational axis Y of the cooling reservoir 5 and/or the receiving opening 6 is preferably arranged in parallel to an axis of rotation X of the brewing unit 1 (see FIG. 1a).

The cooling module 20 comprises cooling means 15 connected to at least a portion of the cooling reservoir 5 when being placed in the support means 5a. The cooling means 15 enable the cooling of a liquid provided in the reservoir 5. The cooling means 15 are preferably connected to a control unit 9 of the device (see FIG. 1b). Thereby, the control unit 9 is designed for setting at least a cooling temperature and a time for cooling the beverage contained within the reservoir 5.

The cooling means 15 are preferably arranged to cool at least a portion of the internal surfaces of the reservoir 5. The cooling means 15 may comprise a refrigerating circuit comprising a compressor, a condenser and an evaporator. The cooling means 15 are preferably adapted for providing a cooling temperature of between 5 to −30° C. within the reservoir 5. Thereby, the cooling means 15 are preferably adapted for providing a different cooling temperature in dependency of a beverage choice or input into a user interface 11 of the device 30.

The cooling module 20 preferably further comprises means for selectively providing an additional liquid component such as e.g. milk or syrup into the cooling reservoir 5. Thereby, the cooling module 20 may comprise liquid injection means connected to a liquid supply for the additional liquid component(s). The liquid injection means may be selectively connectable to the receiving opening 6 of the cooling reservoir 5 or to an inlet means such as a dedicated inlet valve arranged at a lateral surface 5c or at the bottom portion 5b of the cooling reservoir 5.

In a first direct hot beverage dispensing position of the device as shown in FIG. 2, the brewing unit 1 of the hot extraction module 1 is rotatably arranged with respect to the cooling module 20 such that the hot beverage outlet 2 is situated essentially vertically above the support 13 for receiving a receptacle. Accordingly, a hot beverage prepared by means of injection of hot pressurized liquid into a capsule provided to the brewing unit 1 will be dispensed via the hot beverage outlet 2 into a receiving receptacle placed by the user into the support 13 and below the outlet 2.

In order to prepare a cold or mixed beverage by means of the device 30, the user may rotate the brewing unit 1 of the hot extraction module 10 either manually or automatically, e.g. upon pressing a dedicated button or switch into the second cold beverage preparation position of the device 30 as depicted in FIG. 3.

In this second position of the device, the hot beverage outlet 2 is arranged vertically above a receiving opening 6 of the cooling reservoir 5. Hence, a hot beverage prepared by the brewing unit 1 of the hot extraction module 10 will be dispensed in its initial hot state from the hot beverage outlet 2 directly into the cooling reservoir 5. Therein, the beverage is then brought to a lower temperature upon cooling by the dedicated cooling means 15.

Figure 4:
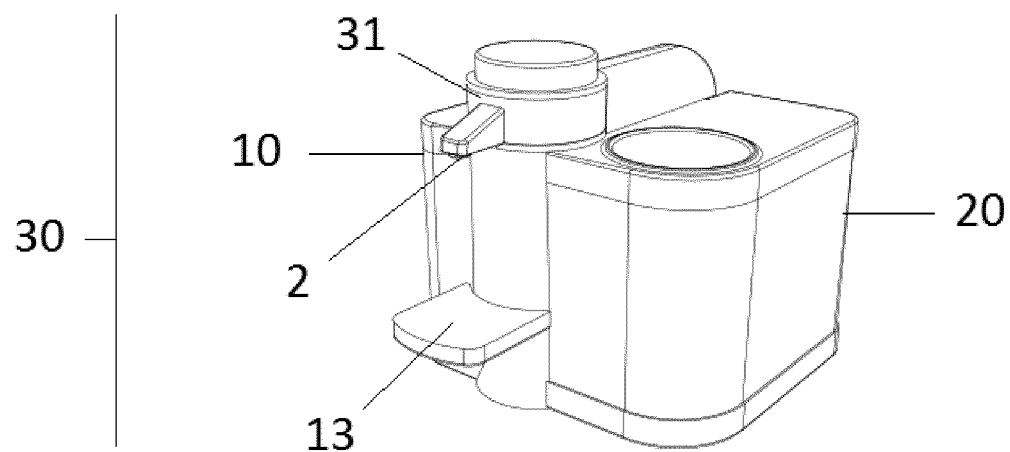
FIG. 4 relates to another preferred embodiment of the device according to the invention in a direct hot beverage preparation position.
Figure 5:
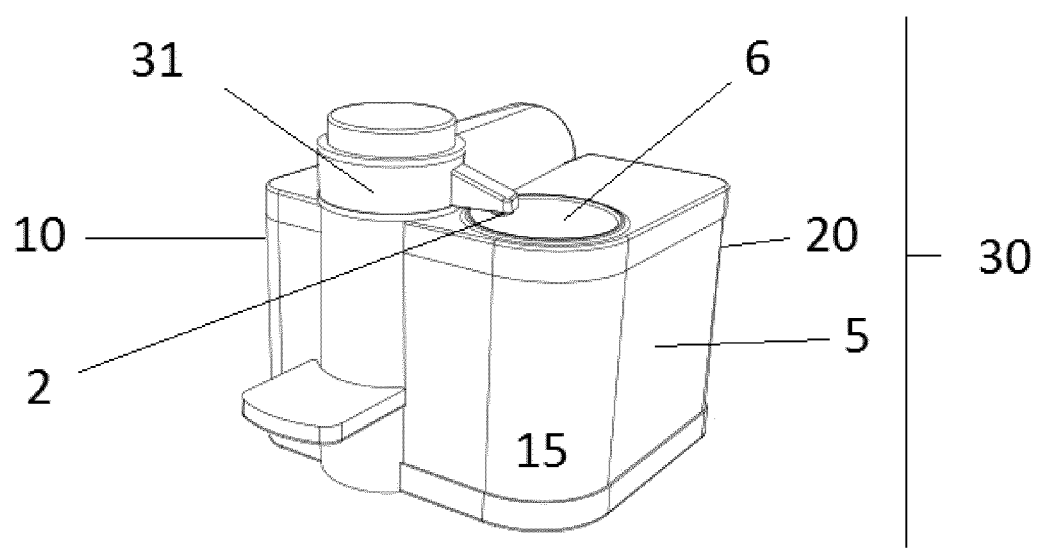
FIG. 5 relates to the embodiment of the device according to FIG. 4 in a cold beverage preparation position respectively in an indirect beverage preparation position.

According to another preferred embodiment of the invention, as shown in FIGS. 4 and 5, instead of the moving (preferably, rotation) of the whole brewing unit 1 with respect to the cooling module 20, as shown in FIGS. 2 and 3, the device 30 is made in such a way that it comprises a collector 31 where the beverage ingredients containing capsule is inserted in the hot extraction module 10, such that the collector 31 is movable with respect to the cooling module 20, preferably by rotation. Typically, the beverage ingredients containing capsule spins at a high rotation inside the collector 31 to obtain the hot beverage. Therefore, as shown in FIG. 4, in a first direct hot beverage dispensing position of the device, the collector 31 and therefore the hot beverage outlet 2 of the hot extraction module 10 is rotatably arranged with respect to the cooling module 20 such that the hot beverage outlet 2 is situated essentially vertically above the support 13 for receiving a receptacle. Accordingly, a hot beverage prepared by means of injection of hot pressurized liquid into a capsule provided in the collector 31 will be dispensed via the hot beverage outlet 2 into a receiving receptacle placed by the user into the support 13 and below the outlet 2.

In order to prepare a cold or mixed beverage by means of the device 30, the user may rotate the collector 31 of the hot extraction module 10 either manually or automatically, e.g. upon pressing a dedicated button or switch into the second cold beverage preparation position of the device 30 as depicted in FIG. 5.

In this second position of the device, the collector 31 and the hot beverage outlet 2 are arranged vertically above a receiving opening 6 of the cooling reservoir 5. Hence, a hot beverage prepared by the hot extraction module will be dispensed in its initial hot state from the hot beverage outlet 2 directly into the cooling reservoir 5. Therein, the beverage is then brought to a lower temperature upon cooling by the dedicated cooling means 15.

Further, a hot beverage provided to the cooling reservoir 5 may be subjected to foaming by means of dedicated foaming means (not shown) arranged in the cooling reservoir 5.

In addition, the hot beverage provided to the cooling reservoir 5 may further be mixed with a second liquid or beverage such as milk or syrup in order to prepare a mixed beverage.

After the preparation of the cooled or mixed beverage within the cooling reservoir 5, the user may disconnect the reservoir 5 from the support means 5a and may pour the final beverage through the opening 6 from the reservoir 5 into a dedicated receiving receptacle.

The device 30 further comprises a user interface 11 that may be arranged at the housing 10a of the hot extraction module 10 or a housing 20a of the cooling module 20. The user interface may be a graphical user interface and may comprise one or more buttons for displaying and selecting of dedicated operational functions of the device 30. The operational parameters and functions of the device that may be selected by the user are preferably dependent on the particular position of the device 30 respectively the relative position of the brewing unit 1 of the hot extraction module 10 with respect to the cooling module 20.

In the first direct beverage preparation position as shown in FIG. 2, the user interface 11 is preferably adapted for enabling only a selection of parameters in relation to a hot beverage to be prepared such as e.g. the setting of the volume and strength of the hot beverage.

In the second cold beverage preparation position as shown in FIG. 3, the user interface 11 is preferably adapted to for enabling only a selection of parameters in relation to the cold or chilled beverage to be prepared such as e.g. the final beverage temperature. In addition, the user interface 11 in this position of the device is adapted to enabling a selection whether the final beverage is to be foamed or whether a liquid additive such as milk or syrup is to be provided to the beverage.

The device 30 preferably comprises dedicated sensors which enable a feedback regarding the rotational position of the brewing unit 1 to the control unit 9 and/or the user interface 11. The device 30 may further comprise driving means such as e.g. an electric motor which enables the rotation of the brewing unit 1 and the hot beverage outlet 2 of the hot extraction module 10.

It is noted that although the present invention has been described with reference to preferred embodiments thereof, many modifications and alternations may be made by a person having ordinary skill in the art without departing from the scope of this invention which is defined by the appended claims.

The invention claimed is:

1. A beverage preparation device for preparing hot and cold beverages, the beverage preparation device comprising:
 a hot extraction module comprising a brewing unit for injection of a hot liquid into a beverage ingredients containing capsule;
 a hot beverage outlet connected to the brewing unit for dispensing of a hot extracted beverage;
 a cooling module comprising a support member and a cooling reservoir for receiving the hot extracted beverage, the support member configured to selectively receive a bottom portion of the cooling reservoir such that a user disconnects the cooling reservoir from the support member in the cooling module and dispenses the cold or chilled beverage from the cooling reservoir,
 the hot beverage outlet and the cooling module are arranged moveably relative to each other such that the hot extracted beverage may be selectively dispensed from the hot beverage outlet into the cooling reservoir of the cooling module in at least one relative position of the hot beverage outlet and the cooling module,
 the brewing unit and the cooling module are configured to rotate relative to each other between a first direct hot beverage dispensing position configured for delivering the hot extracted beverage directly from the hot beverage outlet into a receptacle and a second cold beverage preparation position configured for delivering the extracted beverage directly from the hot beverage outlet to the cooling reservoir to prepare a cold or chilled beverage in the cooling reservoir; and
 a support configured for the receptacle to be positioned on the support, the hot beverage outlet in the first direct hot beverage preparation position is arranged vertically above the support for directly dispensing the hot extracted beverage provided by the brewing unit into the receptacle, and the hot beverage outlet in the second cold beverage preparation position is arranged away from the vertical above the support.

2. The device according to claim 1, wherein the brewing unit is mounted on a rotatable platform member.

3. The beverage preparation device according to claim 1, wherein in the first direct hot beverage dispensing position, the hot beverage outlet is arranged outside of contours of a receiving opening of the cooling reservoir when seen from above.

4. The beverage preparation device according to claim 1, wherein in the second cold beverage preparation position the hot beverage outlet is arranged vertically above a receiving opening of the cooling reservoir.

5. The beverage preparation device according to claim 1, wherein the hot beverage outlet is configured to move about a vertical axis of rotation which is arranged parallel to a rotational axis of a receiving opening of the cooling reservoir.

6. The beverage preparation device according to claim 1, wherein the hot extraction module and the cooling module are spaced apart from each other.

7. The beverage preparation device according to claim 1, wherein the cooling module is configured to selectively provide an additional liquid component into the cooling reservoir.

8. The beverage preparation device according to claim 7, wherein the cooling reservoir is connected to a liquid supply for the additional liquid component.

9. The beverage preparation device according to claim 1, wherein the cooling module comprises foaming means configured for foaming of a liquid contained in the cooling reservoir of the module.

10. The beverage preparation device according to claim 1, wherein the hot extraction module and the cooling module are configured for being controlled independently according to independent beverage modes.

11. The beverage preparation device according to claim 1, wherein the device comprises a control unit configured for providing different operation modes of the device.

12. The beverage preparation device according to claim 11, wherein the control unit is configured for adapting a temperature of the hot liquid for injection into the beverage ingredients containing capsule in the brewing unit of the device.

13. The beverage preparation device according to claim 11, wherein the control unit is configured for controlling a cooling temperature of the cooling module.

14. The beverage preparation device according to claim 1, wherein the device comprises a graphical user interface adapted for enabling a selection of beverage preparation parameters dependent on the relative position of the hot beverage outlet or the brewing unit and the cooling module.

15. A beverage preparation device for preparing hot and cold beverages, the beverage preparation device comprising:
 a hot extraction module comprising a brewing unit for injection of a hot liquid into a beverage ingredients containing capsule;
 a hot beverage outlet connected to the brewing unit for dispensing of a hot extracted beverage;
 a cooling module comprising a support member and a cooling reservoir for receiving the hot extracted beverage, the support member configured to selectively receive a bottom portion of the cooling reservoir such that a user disconnects the cooling reservoir from the support member in the cooling module and dispenses the cold or chilled beverage from the cooling reservoir,
 the hot beverage outlet and the cooling module being arranged moveably relative to each other such that the hot extracted beverage may be selectively dispensed from the hot beverage outlet into the cooling reservoir of the cooling module in at least one relative position of the hot beverage outlet and the cooling module;
 the device further comprises a collector where the beverage ingredients containing capsule is inserted in the hot extraction module, the collector and the cooling module are configured to rotate relative to each other between a first direct hot beverage dispensing position configured for delivering the extracted beverage directly from the hot beverage outlet into a receptacle and a second cold beverage preparation position configured for delivering the extracted beverage directly from the hot beverage outlet to the cooling reservoir to prepare a cold or chilled beverage in the cooling reservoir; and a support configured for the receptacle to be positioned on the support, the hot beverage outlet in the first direct hot beverage preparation position is arranged vertically above the support for directly dispensing the hot extracted beverage provided by the brewing unit into the receptacle, and the hot beverage outlet in the second cold beverage preparation position is arranged away from the vertical above the support.

16. The beverage preparation device according to claim 15, wherein in the first direct hot beverage dispensing position, the hot beverage outlet is arranged outside of contours of a receiving opening of the cooling reservoir when seen from above.

17. The beverage preparation device according to claim 15, wherein in the second cold beverage preparation position the hot beverage outlet is arranged vertically above a receiving opening of the cooling reservoir.

18. The beverage preparation device according to claim 15, wherein the hot beverage outlet is configured to move about a vertical axis of rotation which is arranged parallel to a rotational axis of a receiving opening of the cooling reservoir.

19. The beverage preparation device according to claim 15, wherein the hot extraction module and the cooling module are spaced apart from each other.

20. The beverage preparation device according to claim 15, wherein the cooling module is configured to selectively provide an additional liquid component into the cooling reservoir.

21. The beverage preparation device according to claim 15, wherein the cooling module comprises foaming means configured for foaming of a liquid contained in the cooling reservoir of the module.

22. The beverage preparation device according to claim 15, wherein the hot extraction module and the cooling module are configured for being controlled independently according to independent beverage modes.

23. The beverage preparation device according to claim 15, wherein the device comprises a control unit configured for providing different operation modes of the device.

24. The beverage preparation device according to claim 15, wherein the device comprises a graphical user interface adapted for enabling a selection of beverage preparation parameters dependent on the relative position of the hot beverage outlet or the brewing unit and the cooling module.

* * * * *